(12) United States Patent
Nicolle

(10) Patent No.: US 11,801,460 B2
(45) Date of Patent: Oct. 31, 2023

(54) FILTERING UNIT WITH IMPROVED COVER ASSEMBLY

(71) Applicants: Alfa Laval Moatti SAS, Elancourt (FR); Alfa Laval Corporate AB, Lund (SE)

(72) Inventor: Adrien Nicolle, Elancourt (FR)

(73) Assignees: ALFA LAVAL MOATTI SAS, Elancourt (FR); ALFA LAVAL CORPORATE AB, Lund (SE)

( * ) Notice: Subject to any disclaimer, the term of this patent is extended or adjusted under 35 U.S.C. 154(b) by 108 days.

(21) Appl. No.: 17/636,128

(22) PCT Filed: Jun. 29, 2020

(86) PCT No.: PCT/EP2020/068240
§ 371 (c)(1),
(2) Date: Feb. 17, 2022

(87) PCT Pub. No.: WO2021/032345
PCT Pub. Date: Feb. 25, 2021

(65) Prior Publication Data
US 2022/0331715 A1      Oct. 20, 2022

(30) Foreign Application Priority Data
Aug. 19, 2019   (EP) ..................... 19306019

(51) Int. Cl.
*B01D 25/32*      (2006.01)
*B01D 25/26*      (2006.01)

(52) U.S. Cl.
CPC ........... *B01D 25/327* (2013.01); *B01D 25/26* (2013.01)

(58) Field of Classification Search
None
See application file for complete search history.

(56) References Cited

U.S. PATENT DOCUMENTS

| 2,985,306 A | 5/1961 | Statzell |
| 3,739,914 A | 6/1973 | Moatti |

(Continued)

FOREIGN PATENT DOCUMENTS

| CH | 386 989 A | 1/1965 |
| CN | 1071366 A | 4/1993 |

(Continued)

OTHER PUBLICATIONS

International Search Report, issued in PCT/EP2020/068240, dated Oct. 19, 2020.

(Continued)

*Primary Examiner* — Bradley R Spies
*Assistant Examiner* — Jeannie McDermott
(74) *Attorney, Agent, or Firm* — Birch, Stewart, Kolasch & Birch, LLP

(57) ABSTRACT

A filtering unit includes a filtering component having a pre-filter chamber circumferentially compartmented in sectors, a filtering medium and a post-filtering chamber, a divider arranged coaxially with the filtering component and having distinct distribution columns, a cover and a rotary backwashing distributor having a shutter provided with a discharge opening. The rotary backwashing distributor is mounted to rotate so that the discharge opening is periodically and selectively put into communication with each distribution column. Each distribution column periodically and selectively establishes communication between the discharge opening and respective ones of the sectors. The filtering unit further includes a dividing plate arranged between the cover and the rotary backwashing distributor, the dividing plate being detachably secured with respect to the cover and having apertures opening into the distribution columns. The shutter abuts the dividing plate at least around the discharge opening.

20 Claims, 5 Drawing Sheets

(56) References Cited

U.S. PATENT DOCUMENTS

| | | | |
|---|---|---|---|
| 4,549,961 | A | 10/1985 | Bellemann et al. |
| 4,601,826 | A | 7/1986 | Christophe et al. |
| 4,636,311 | A | 1/1987 | Litzenburger |
| 5,628,898 | A | 5/1997 | Eimer et al. |
| 7,104,192 | B1 | 9/2006 | Corcoran |
| 7,297,265 | B1 | 11/2007 | Booth et al. |
| 7,841,478 | B2 | 11/2010 | Mangano |
| 8,066,791 | B2 | 11/2011 | Baseotto et al. |
| 8,968,558 | B2 | 3/2015 | Isch et al. |
| 9,138,666 | B2 | 9/2015 | Chrupalla |
| 9,162,165 | B2 | 10/2015 | Mangano |
| 2005/0092184 | A1 | 5/2005 | Becker |
| 2008/0041795 | A1 | 2/2008 | Thalmann et al. |
| 2013/0042587 | A1 | 2/2013 | Traub |
| 2013/0161252 | A1* | 6/2013 | Chrupalla ............ B01D 25/327 210/411 |
| 2014/0025650 | A1 | 1/2014 | Lee et al. |
| 2015/0090655 | A1 | 4/2015 | Rau et al. |
| 2017/0151512 | A1 | 6/2017 | Takahashi |
| 2018/0083238 | A1 | 3/2018 | Pflueger et al. |

FOREIGN PATENT DOCUMENTS

| | | |
|---|---|---|
| CN | 201283238 Y | 8/2009 |
| CN | 203609954 U | 5/2014 |
| CN | 106429642 A | 2/2017 |
| CN | 107488653 A | 11/2017 |
| CN | 207102049 U | 3/2018 |
| CN | 207554704 U | 6/2018 |
| CN | 108707987 A | 10/2018 |
| CN | 208082024 U | 11/2018 |
| CN | 288311133 U | 1/2019 |
| CN | 109311028 A | 2/2019 |
| CN | 208927745 U | 6/2019 |
| CN | 299181146 U | 7/2019 |
| DE | 196 03 856 C2 | 12/1997 |
| EP | 0 128 988 A2 | 10/1984 |
| EP | 0 479 977 A1 | 4/1992 |
| EP | 1 466 655 A1 | 10/2004 |
| EP | 2 611 514 B1 | 4/2016 |
| EP | 3 199 219 A1 | 8/2017 |
| EP | 3 254 743 A1 | 12/2017 |
| FR | 2 992 924 A1 | 12/2007 |
| FR | 2 889 666 B1 | 6/2008 |
| FR | 2 992 569 B1 | 7/2014 |
| GB | 2 103 102 A | 2/1963 |
| GB | 1 335 988 A | 10/1973 |
| JP | 58-40119 A | 3/1983 |
| RU | 2 080 906 C1 | 6/1997 |
| RU | 2 545 586 C2 | 4/2015 |
| RU | 2 686 911 C1 | 5/2019 |
| WO | WO 2012/011758 A2 | 1/2012 |
| WO | WO2012/028824 A1 | 3/2012 |
| WO | WO 2012/067518 A1 | 5/2012 |
| WO | WO 2013/114329 A1 | 8/2013 |
| WO | WO 2017/129701 A1 | 8/2017 |
| WO | WO 2017/211577 A1 | 12/2017 |
| WO | WO 2017/216018 A1 | 12/2017 |

OTHER PUBLICATIONS

Written Opinion of the International Searching Authority, issued in PCT/EP2020/068240, dated Oct. 19, 2020.

Indian Office Action for Indian Application No. 202217012616, dated Jun. 27, 2022.

English translation of the Chinese Office Action and Search Report for corresponding Chinese Application No. 202080058436.X, dated Sep. 19, 2022.

Li et al., "Application of Automatic Backwash Filter Technology in Water Treatment of Offshore Oil Platform," Mechanical Engineer, Jan. 10, 2013, pp. 101-103, with English Abstract.

English translation of the Chinese Office Action and Search Report for corresponding Chinese Application No. 202080058436.X, dated Mar. 3, 2023.

English translation of the Russian Office Action for corresponding Russain Application No. 2022107080, dated Aug. 4, 2022.

English translation of the Russian Search Report for corresponding Russain Application No. 2022107080, dated Aug. 4, 2022.

* cited by examiner

FILTERING UNIT WITH IMPROVED COVER ASSEMBLY

TECHNICAL FIELD

The present disclosure relates to a filtering unit with automatic backwashing. More particularly, the disclosure relates to an improvement of a cover assembly of such a filtering unit.

TECHNOLOGICAL BACKGROUND

The international application WO 2012/028824 describes a filtering unit comprising at least two filter elements, each filter element having an internal face, an external face, a filtering mesh, two concentric circular edges, respectively an inner edge and an outer edge between which said filtering mesh extends, and radial ribs provided at least on the internal face, said radial ribs extending between said concentric edges and being distributed circumferentially in order to form distinct sectors on said internal face. Said filter elements are configured to be assembled against each other so that their respective internal faces face each other so as to define a space between them, wherein said radial ribs delimiting the sectors form circumferential compartments in said space. At least one of said inner edge and outer edge has passages respectively communicating with corresponding ones of the sectors. The filter elements are stacked along an axial direction between a first cover and a second cover.

By stacking a selected number of filter element pairs, a desired filter area is obtained for an intended application. Typically, the fluid for filtering penetrates into the stack via passages of the inner edge, passes through the filtering mesh, and, once purified, exits via other passages defined in the outer edge. Naturally, the flow of fluid through the filtering mesh could be reversed or arranged in some other way.

The filter described in that publication further comprises a divider arranged coaxially with the filter elements, the divider having distinct distribution columns, and a rotary backwashing distributor provided at the first cover. The rotary backwashing distributor has a shutter provided with a discharge opening and is mounted to rotate so that said discharge opening is periodically and selectively put into communication with each distribution column, whereby each distribution column periodically and selectively establishes communication between the discharge opening and respective ones of the passages.

In this way, periodically, the fluid flow is reversed in the sectors corresponding to passages in fluid communication with the discharge opening, which enables backwashing to be performed in these sectors due to the pressure gradient across the filtering mesh, i.e. the pressure gradient between the external face side and the internal face side. The fluid used for backwashing is then discharged through the discharge opening.

This filtering unit of the prior art comprises a distribution spacer forming an integral part of the first cover. This distribution spacer has passages extending said distribution columns and the shutter is in sealing and sliding contact with an annular surface of the distribution spacer into which said passages open out.

Now, a need has arisen for an improved distribution arrangement. One such need is the requirement for more efficient filters. Therefore, there is a need for a new type of filtering units.

SUMMARY

In this respect, the present disclosure relates to a filtering unit comprising: a filtering component having an inner wall, an outer wall arranged around the inner wall so as to define an inner space between the inner wall and the outer wall, and a filtering medium partitioning the inner space into a pre-filter chamber and a post-filter chamber, at least said pre-filter chamber being circumferentially compartmented in sectors, at least one of said inner wall and outer wall having passages respectively communicating with corresponding ones of the sectors; a divider arranged coaxially with the filtering component, the divider having distinct distribution columns; a cover arranged at an axial end of the filtering component; and a rotary backwashing distributor having a shutter provided with a discharge opening, the rotary backwashing distributor being mounted to rotate so that said discharge opening is periodically and selectively put into communication with each distribution column, whereby each distribution column periodically and selectively establishes communication between the discharge opening and respective ones of the passages. The filtering unit is characterized in that the filtering unit further comprises a dividing plate arranged between the cover and the rotary backwashing distributor, the dividing plate being detachably secured with respect to the cover and having apertures opening into the distribution columns, and in that the shutter abuts a contact surface of the dividing plate at least on a closed contour surrounding the discharge opening.

The pre-filter chamber is the part of the inner space wherein fluid to be filtered flows. The fluid then crosses the filtering medium, is thereby filtered, and enters the post-filter chamber. The pre-filter chamber and the post-filter chamber are on either sides of the filtering medium.

The rotary backwashing distributor is rotatable with respect to the divider. Thus, if the distribution columns of the divider are arranged along a circumference or equivalent, the discharge opening can easily be put in fluid communication with the distribution columns in a sequential and periodic manner.

As used in the present disclosure, the singular forms «a», «an», and «the» are intended to include the plural forms as well, unless the context clearly indicates otherwise. For instance, the filtering unit may comprise a plurality of filtering components. Conversely, as used herein, plural forms may be generic and include singular forms as a particular embodiment.

The coaxial arrangement of the divider and the filtering component defines an axial direction. A radial direction is direction perpendicular to the axial direction and intersecting the axial direction.

The cover may be configured to hold the filtering component in place, and/or several filtering components with respect to one another, e.g. in sealing contact with one another, and/or to participate in the structure of the filtering unit. Specifically, the cover may structurally support the elements of the backwashing mechanism. Besides, the cover may define a wall of the pre-filter chamber or the post-filter chamber. Specifically, the cover may separate the flows of fluid upstream of the filtering component and downstream of the filtering component.

The dividing plate being arranged between the cover and the rotary distributor, e.g. axially between the cover and the rotary distributor, implies that at least part of the contact between the cover and the rotary distributor is indirect and is achieved through the dividing plate as an intermediate part. This is confirmed by the shutter of the rotary backwashing distributor abutting a contact surface of the divining plate. The cover and the dividing plate are arranged at a same side of the filtering component, thus forming a cover assembly.

The dividing plate may be selectively secured (attached) and detached with respect to the cover. That is, the dividing plate may be selectively secured (attached) to and detached from the cover itself or any other part that makes it have a fixed position with respect to the cover. In other words, the dividing plate may be directly or indirectly secured to the cover, and in a detachable manner.

The apertures of the dividing plate are through-holes. The apertures are configured to enable fluid communication between the rotary backwashing distributor and the distribution columns. In other words, the apertures extend the distribution columns.

The cover is an important part of the filtering unit which has many functions. As a result, the cover is often expensive and relatively difficult to manufacture. The inventors have noted that, due to its sealing contact with the rotary backwashing distributor, the cover tends to wear.

Thanks to the dividing plate being a distinct part from the cover and being detachably secured thereto, both the cover and the dividing plate can be designed and manufactured separately and therefore more efficiently in view of their respective functions. Furthermore, the dividing plate can be replaced without replacing the whole cover, which makes maintenance operations faster and cheaper. In addition, providing the dividing plate helps reducing wear, or at least helps coping with the consequences thereof by replacing the dividing plate. Furthermore, the shutter of the rotary backwashing distributor abuts a contact surface of the dividing plate at least on a closed contour surrounding the discharge opening. Therefore, sealing contact between the rotary backwashing distributor, particularly the discharge opening, and the dividing plate can be more reliably ensured and leakage can be reduced, if not avoided. As a consequence, the overall efficiency of the filtering unit is improved.

In addition, since the rotary backwashing distributor may not contact the divider but abuts the dividing plate instead, the divider may be left with sharp edges which also improve sealing. The overall efficiency of the filtering unit is thus further improved.

In some embodiments, the contact surface of the dividing plate, for contact with the shutter of the rotary backwashing distributor, is axisymmetric. The previously mentioned apertures may open into the axisymmetric contact surface.

In some embodiments, the contact surface of the dividing plate, for contact with the shutter of the rotary backwashing distributor, is planar. The previously mentioned apertures may open into the planar contact surface. In these embodiments, sealing is more reliably ensured as compared to embodiments in which the contact surface between the rotary backwashing distributor and the dividing plate includes surface portions which are not contained in a plane. The whole contact surface between the dividing plate and the rotary backwashing distributor may be contained within a plane. Alternatively, the dividing plate may be provided with a non-planar contact surface, such as curved or slightly conical, or with both planar and non-planar contact surface portions, such as at different radii.

In some embodiments, the apertures are aligned with the distribution columns. That is, the apertures may have the same cross-section as the distribution columns, respectively, or a corresponding cross-section. The apertures may be arranged continuously with the distribution columns. In these embodiments, sealing between the apertures and the distribution columns is more reliable and additional pressure losses within the filtering unit are avoided.

In some embodiments, the filtering unit further comprises an indexer configured to index a position of the dividing plate with respect to the divider. The indexer may index a rotational position of the dividing plate, or an orientation of the dividing plate, about the axial direction. The indexer may index a position of the dividing plate with respect to the divider, directly or through at least a third element which is fixed with respect to the divider. Furthermore, the indexer may be integral with the dividing plate or the divider.

In some embodiments, the dividing plate extends radially beyond the divider. That is, the dividing plate extends radially more inwards and/or more outwards than the divider, depending on the configuration of the divider and the filtering component. Thus, the dividing plate may provide an axial abutment for the divider.

In some embodiments, the cover has an axial opening for circulation of fluid from the distribution columns or to the distribution columns, and the dividing plate is radially greater than the axial opening. In these embodiments, the dividing plate may lie against the cover while covering—excluding the apertures—the axial opening. The divider may extend at least partly through the axial opening.

In some embodiments, the dividing plate abuts the cover and the divider, on a side of the cover opposite the filtering component. The dividing plate may be maintained against the cover and the divider by static means, e.g. fasteners, or dynamic means, such as elastic means (springs, resilient material, etc.). Therefore, fluid-tightness is even more reliable.

In some embodiments, the filtering unit further comprises a fastener for fastening the dividing plate to the cover, the fastener being arranged outside of a path of the rotary backwashing distributor on the dividing plate. The path of the rotary backwashing distributor on the dividing plate includes the surface of the dividing plate which happens to be in contact with the rotary backwashing distributor during a full rotation of the rotary backwashing distributor.

In these embodiments, the fastener may directly fasten the dividing plate to the cover. Thus, there could be a possibility for the rotary backwashing distributor to come into contact with the fastener, especially when the fastener is arranged on the face of the dividing plate which the rotary backwashing distributor abuts. However, thanks to the fastener being arranged outside of a path of the rotary backwashing distributor on the dividing plate, these embodiments ensure that there is no contact between the fastener and the rotary backwashing distributor. As a consequence, the sealing contact between the rotary backwashing distributor and the dividing plate is more reliable. In some embodiments, the fastener may be arranged proximate to a path of the rotary backwashing distributor on the dividing plate.

In some embodiments, the dividing plate comprises an annular portion radially adjacent to the apertures. The annular portion may axially face the cover.

In some embodiments, the fastener is provided on the annular portion.

In some embodiments, the dividing plate is secured to the divider. In these embodiments, the dividing plate may be detachably or non-detachably secured with respect to the divider, and/or the divider may be detachably or non-detachably secured with respect to the cover. Thanks to the dividing plate being secured to the divider, the relative positions of the divider and the dividing plate is controlled throughout operation of the filtering unit. Therefore, fluid-tightness and efficiency are improved.

In some embodiments, the divider has a bore and the dividing plate has a hole, and an insert is fitted in the bore and the hole to secure the dividing plate to the divider. The insert may be hollow, so that a mechanical part and/or fluid may pass through the insert. The insert may be threaded and/or have any type of protuberances or recesses to cooperate with the dividing plate and/or the divider.

In some embodiments, a contact surface of the dividing plate, for contact with the rotary backwashing distributor, has a friction coefficient less than a friction coefficient of the cover. Due to the cover and the dividing plate being two distinct parts, their respective materials can be chosen according to different criteria. In order to limit wear and enhance fluid-tightness, the friction coefficient of the dividing plate, or at least of a contact surface of the dividing plate for contact with the rotary backwashing distributor, can be chosen less than the friction coefficient of the cover. The friction coefficient is proportional to the resistance to which the rotary backwashing distributor is subjected when sliding on the dividing plate (or on the cover, respectively). In other words, the force necessary to make the rotary backwashing distributor follow a given path when abutting the dividing plate is less than the force necessary to make the rotary backwashing distributor follow the same path when abutting the cover. As a consequence, the driving torque of the rotary backwashing distributor can be reduced, which leads to energy savings and efficiency increase.

In some embodiments, the filtering component comprises a stack of filter elements.

In some embodiments, each filter element has an inner edge and a concentric outer edge, and a filtering medium extending between the inner edge and the outer edge, and the inner wall comprises the stack of the inner edges and the outer wall comprises the stack of the outer edges.

In some embodiments, each filter element has an internal face and an external face, and wherein two adjacent filter elements of at least one pair of filter elements of the stack are assembled one against the other so that their facing internal faces define a space that is radially compartmented in sectors by contacting radial ribs of said internal faces, said outer edges and inner edges having respective passages communicating with corresponding ones of the sectors. Said space may form at least a part of the pre-filter chamber. The sectors may correspond to the distribution columns of the divider.

The present disclosure is further directed to a filter comprising a filtering unit as previously described.

The present disclosure is further directed to a method of repairing a filtering unit as previously described, the method comprising:
removing the rotary backwashing distributor;
detaching the dividing plate;
securing a replacement dividing plate with respect to the cover;
setting back the rotary backwashing distributor.

These steps can be carried out in this order or in any technically possible order. Removing the rotary backwashing distributor may be necessary to detach the dividing plate, since the dividing plate is arranged between the cover and the rotary backwashing distributor. The rotary backwashing distributor may be set aside while the dividing plate is replaced, and set back afterwards in an operational position. The rotary backwashing distributor that is set back may also be a replacement distributor.

The detaching step implies separating the dividing plate from the cover, in order to provide enough space to secure a replacement (new or repaired) dividing plate with respect to the cover.

This repairing method enables easy and cheap maintenance of the filtering unit.

BRIEF DESCRIPTION OF THE DRAWINGS

The invention and advantages thereof will be better understood upon reading the detailed description which follows, of embodiments given as non-limiting examples. This description refers to the appended drawings, wherein.

DETAILED DESCRIPTION OF EMBODIMENTS

Figure 1:
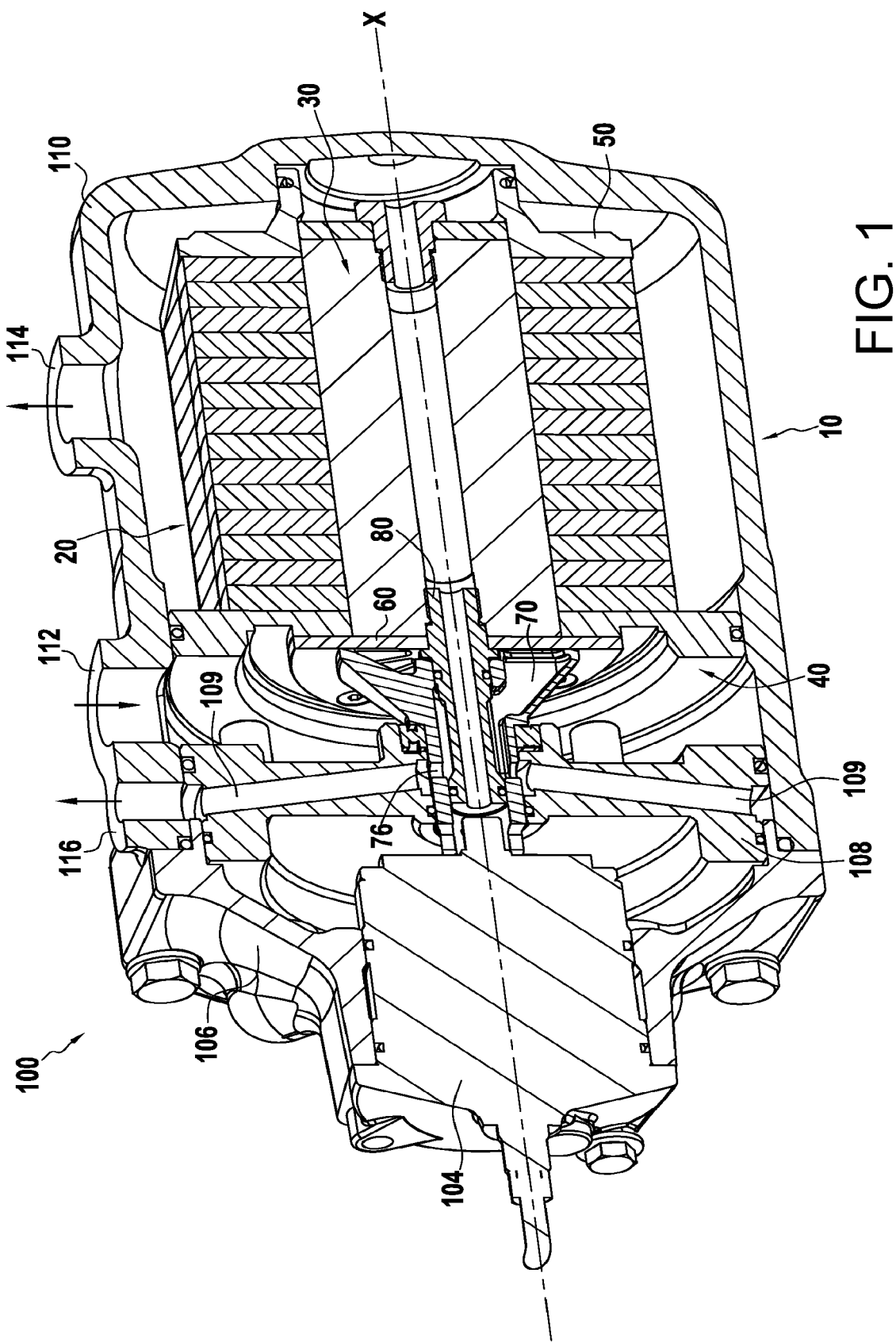
FIG. 1 is a cross-sectional view of a filter according to an embodiment.

A filter 100 according to an embodiment is represented in FIG. 1. As previously indicated, the filter 100 comprises a casing 110 and a filtering unit 10 with automatic backwashing housed in the casing 110. The filter 100 is suitable for filtering fluids such as fuel, oil, water, etc. Applications for such a filter include lubrication fluid or control fluid filtering for vehicle engines, e.g. two-stroke and four-stroke engines.

Figure 2:
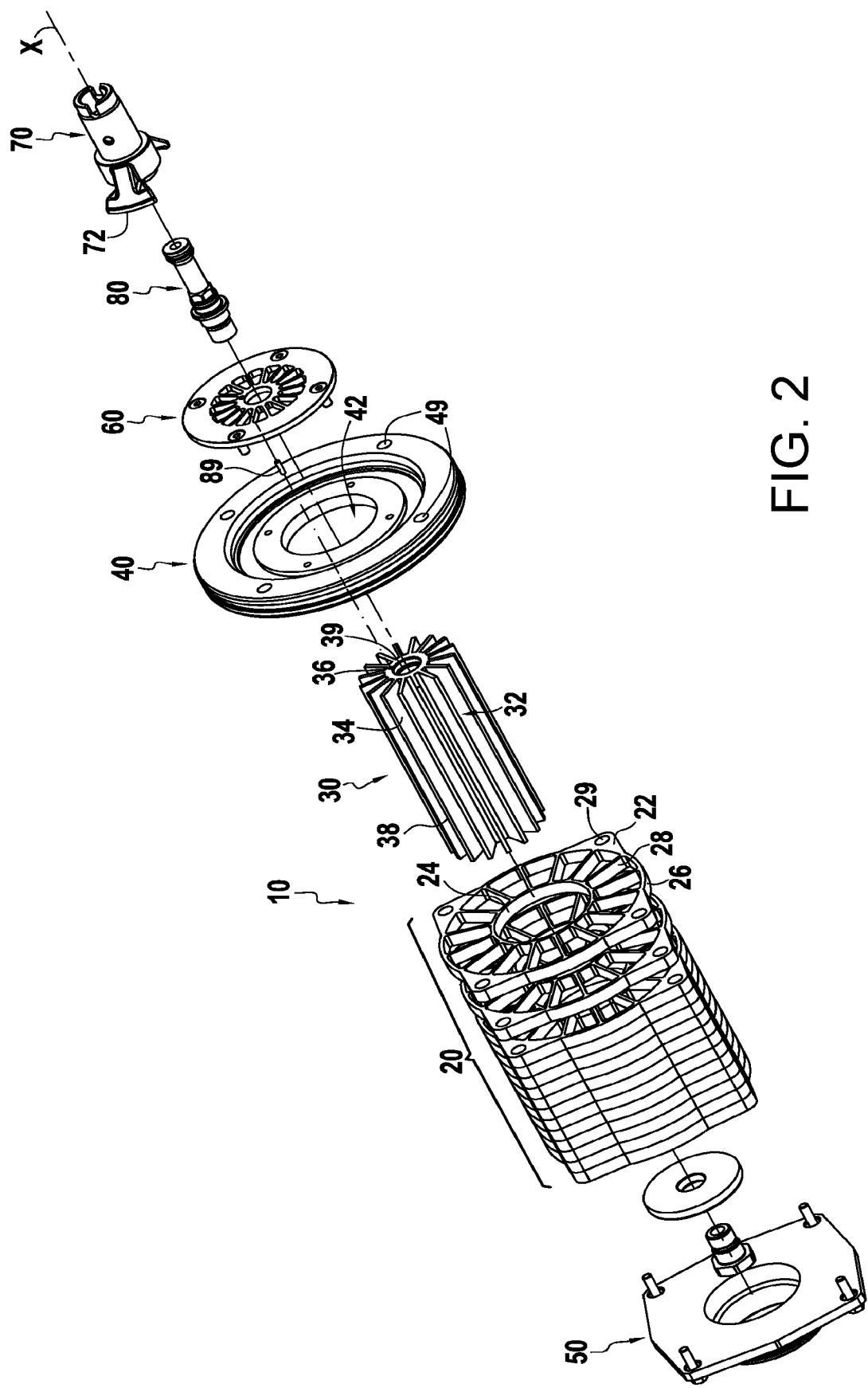
FIG. 2 is a perspective exploded view of a filtering unit according to an embodiment.

The filtering unit 10, more specifically shown in FIG. 2, comprises a filtering component 20. In this embodiment, the filtering component 20 comprises a stack of filter elements 22 along an axial direction X. The filter elements 22 are shown simplified in the figures. Examples for such filter elements are described in more details in European patent applications EP 3 199 219 and EP 3 254 743. However, the filtering unit according to the invention could be implemented with other filter elements.

The filter element 22 has a filtering medium (not shown), two concentric circular edges, respectively an inner edge 24 and an outer edge 26 between which said filtering medium extends. The filtering medium may include, in this example, a monolayer or multilayer filtering mesh of desired filtration size. The concentric circular edges 24, 26 are circular about the axial direction X. The inner edge 24 (resp. the outer edge) mainly extends in a radial plane which is perpendicular to the axial direction X, i.e. a radial plane. The stacked inner edges 24 form an inner wall and the stacked outer edges 26 form an outer wall of the filter component.

For instance, liquid to be filtered can enter the stack of filter elements 20 shown in FIG. 2 through a passage (not shown) in the inner edge 24 of a filter element 22, flow through the filtering medium 22 to pass from one face of said filter element 22, the space on this face forming a pre-filter chamber, to the other face of said filter element 22, the space on this face forming a post-filter chamber, whereby the liquid is filtered, and flow out of the filter element 22 through a passage (not shown) in the outer edge 26. The opposite flow direction is possible as well.

Radial ribs 28 extend between the inner edge 24 and the outer edge 26, in the radial direction. The radial ribs 28 are distributed circumferentially in order to form sectors at least on the side of the filtering medium on which non-filtered liquid is introduced, in order to enable de-clogging the filtering medium by backwashing, as will be explained hereafter. Although sixteen sectors are illustrated, the filter element can have less or more sectors depending in particular on its diametrical size. For example, a filter element having a smaller outer diameter may have a smaller number of sectors, and a filter element having a larger outer diameter may have a larger number of sectors.

The respective passages in the inner edge 24 and in the outer edge 26 respectively communicate with corresponding ones of the sectors.

A divider 30 is arranged coaxially with the filter component 20, namely with the filter elements 22. In this embodiment, the divider 30 is arranged radially inside the cylindrical space defined by the set of inner edges 24 of all of the filter elements 22. The divider 30 has distinct distribution columns 32. In this embodiment, the divider 30 co-operates with the filter component 20 to define a set of distribution columns 32. The number of distribution columns 32 is preferably the same as the number of sectors defined in the filter elements 22. Other embodiments are also contemplated, in which the number of columns and sectors do not coincide. In particular, the number of columns may be less than the number of sectors, such that a single column may simultaneously communicate with a plurality of sectors.

According to the example illustrated in FIG. 2, the divider 30 has plane fins 34 that are regularly distributed circumferentially and that extend in planes containing the common axial direction X of all of the filter elements 22. More precisely, the fins 34 are attached to an axial cylindrical core 36 and the edges 38 of the fins 34 are in contact with the respective inner edges 24 of the stacked filter elements 22.

Each distribution column 32 is thus defined between two adjacent fins 34 and a portion of the inner wall formed by the stacked inner edges 24. Each distribution column 32 communicates with the passages of the inner edges 24 extending along a common direction parallel to the axial direction X. These passages constitute all of the inlets of the individual filter elements 22 in the stack that correspond to a given angular sector of the filtering unit 10 and that can be isolated in order to be subjected to a backwashing operation by reversing the flow direction of the filtered liquid.

The divider 30 described in this embodiment has a constant axial cross-section and can, thus, advantageously be manufactured by extrusion. In this embodiment, the divider 30 is made of a single piece.

The divider 30 may be made of a number of different materials, including metal, plastic or ceramic materials, or combinations thereof.

Further structural details about the divider 30 may be found in the published application WO 2012/028824. The present invention may also be implemented with any other suitable type of divider, including but not limited to the type represented in FIG. 11 of the published application WO 2012/028824.

The filtering unit 10 further comprises a cover 40 arranged at an axial end of the filtering component 20. In this embodiment, the filtering component 20 is held between the cover 40, forming a first cover 40, and a second cover 50. In other words, in this embodiment, the filtering component 20 is axially bounded by the first cover 40 and the second cover 50. The second cover 50 is known per se to the skilled person.

The first cover 40 may be mounted fixedly to the second cover 50 while holding the filtering component 20, e.g. by assembly rods passing through orifices 49 of the cover and register orifices 29 of the filter elements 22. The first cover 40 may be further maintained thanks to a non-illustrated retaining plate known per se to the skilled person.

The first cover 40 is a generally annular part. The first cover 40 has an axial opening 42 through which the divider 30 extends. Thus, the axial opening 42 is provided for circulation of fluid from the distribution columns 32 or to the distribution columns 32.

Figure 3:
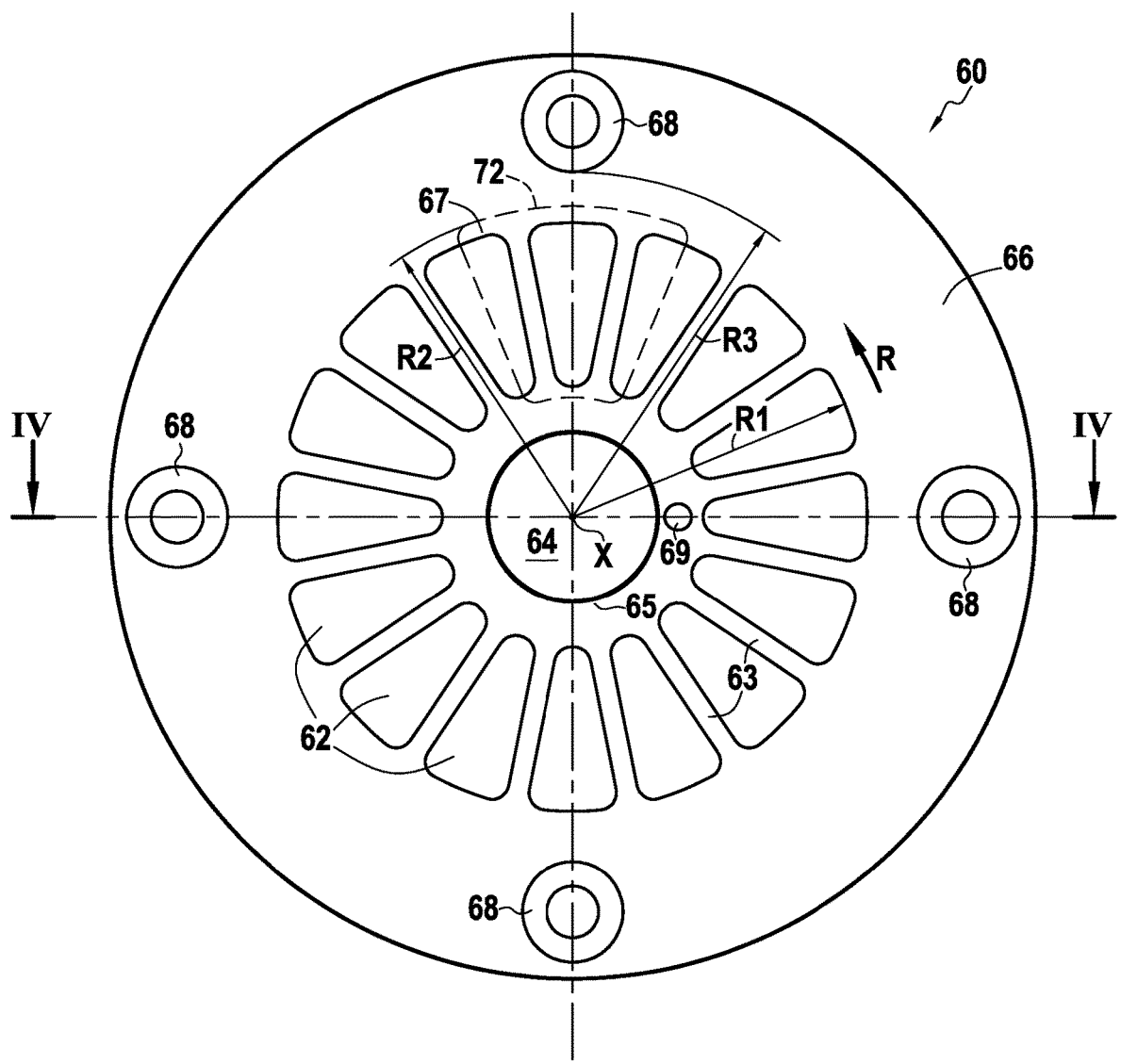
FIG. 3 is a front view of a dividing plate of the embodiment.

The filtering unit 10 further comprises a dividing plate 60. As illustrated in FIG. 3, in this embodiment, the dividing plate 60 is a generally disc-shaped member. The dividing plate 60 has a plurality of apertures 62. There may be as many apertures 62 as distributions columns 32; however, in other embodiments, there may be provided more or less apertures 62 than distribution columns 32. In this embodiment, the apertures 62 are identical to one another and regularly distributed over a circumference of the dividing plate 60.

In this embodiment, the dividing plate 60 has a hole 64, here positioned at a central position of the dividing plate 60. The hole 64 may be circular. Further outwards from the hole 64, the apertures 62 are provided. The apertures extend up to a radius R1, measured from the center of the dividing plate 60 (which corresponds, here, to a center of the hole 64) to the radially outer end of the apertures 62.

The dividing plate 60 further comprises an annular portion 66 radially adjacent to the apertures 62. In this embodiment, the annular portion 66 is outwards from the apertures 62. That is, the annular portion extends from the radius R1 to the outer end of the dividing plate 60. The annular portion essentially has the shape of a ring and may be, as in the present embodiment, circular.

In this embodiment, the apertures 62 are defined between radial ribs 63 extending from an edge 65 of the hole 64 to the annular portion 66. Here, the apertures 62 have substantially the same cross-section as the distribution columns 32. In this example, the apertures 62 have the same sector-shaped cross-section as the distribution columns 32 but for rounded corners. The rounded corners may ease manufacturing, e.g. by injection molding. However, other manufacturing processes are contemplated, such as machining, milling, casting, additive manufacturing, blanking, etc.

Figure 4:
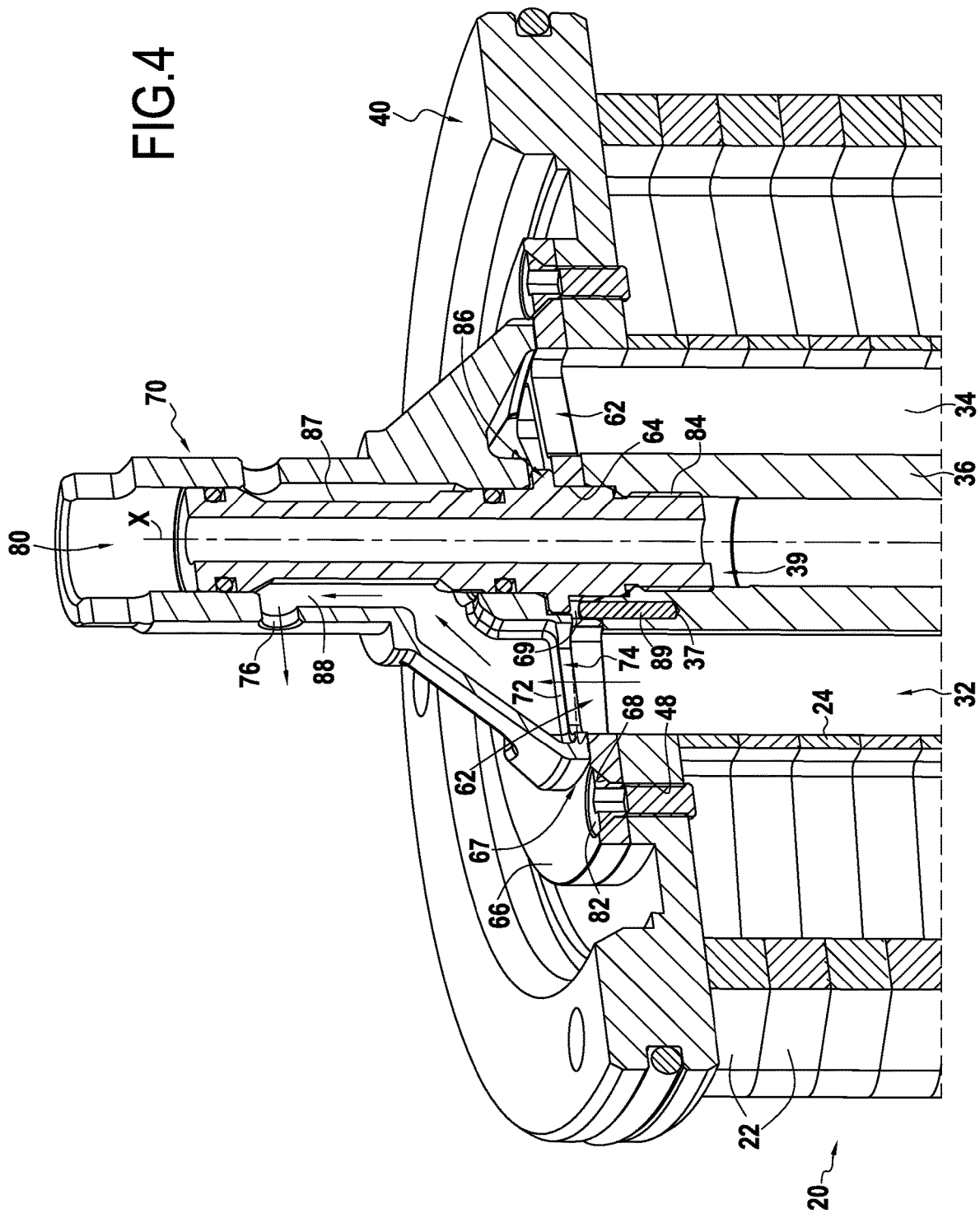
FIG. 4 is a perspective cross-sectional view of the filtering unit according to plane III-III in FIG. 3.

As best seen in FIG. 4, the dividing plate 60, and here the annular portion 66, is radially greater than the axial opening 42 of the first cover 40. Besides, the dividing plate 60 extends radially beyond the divider 30. Thus, when mounted, the dividing plate 60 may abut both the first cover 40 and the divider 30 in the axial direction X. More generally, the dividing plate 60 may abut either the cover or the divider. As illustrated in FIG. 4, such abutment occurs on a side of the first cover 40 opposite the filtering component 20 (in the axial direction X).

As shown in FIG. 2, the dividing plate 60 is to be detachably secured with respect to the first cover 40. Once the dividing plate 60 is secured with respect to the first cover 40, the apertures 62 open into the respective distribution columns 32 formed by the divider 30.

In this embodiment, the dividing plate 60 is directly secured to the first cover 40. Besides, as shown in FIG. 4, at least one removable fastener 82, such as a screw, may be provided to detachably secure the dividing plate 60 with respect to the first cover 40. Although a plurality of fasteners are provided in this embodiment (namely, four), only one fastener is described below for the sake of conciseness. The fasteners 82 may be identical to one another or different from one another.

In this embodiment, the fastener 82 is mounted in an orifice 68 provided in the dividing plate 60, and more specifically in the annular portion 66, and a corresponding orifice 48 provided in the first cover 40. Thus, the fastener 82 is located on the annular portion 66 of the dividing plate 60. As illustrated, the orifice 68 may be tapered.

The filtering unit 10 further comprises a rotary backwashing distributor (or "distributor") 70. The distributor 70 is mounted to rotate with respect to the divider 30. The distributor 70 has a shutter 72 provided with a discharge opening 74 (see FIG. 4) and is mounted so that said discharge opening 74 is periodically and selectively put into communication with each distribution column 32, whereby each distribution column 32 periodically and selectively establishes communication between the discharge opening 74 and respective ones of the passages of the inner edges 24. Means for holding and driving the distributor in rotation are known per se in the art.

In the embodiment shown, the shutter 72 is a plane portion of the distributor 70 having a well-defined angular extension related to the dimensions of the sectors and has a plane surface that is in sliding and sealing contact with a face of the dividing plate 60. Other shapes of the shutter 72 are also contemplated, such as a conical or curved shape, as long as they correspond to the shape of the dividing plate 60 to enable sliding and sealing contact therebetween. More generally, the distributor 70 is configured to abut or come into contact with the dividing plate 60, whereby the dividing plate 60 is arranged between the first cover 40 and the rotary backwashing distributor 70.

As previously indicated, in the embodiment shown in FIGS. 1-4, the dividing plate 60 has an axisymmetric and here planar contact surface 67 for contact with the rotary backwashing distributor 70. More specifically, in this embodiment, the dividing plate 60 has two planar end surfaces, one of which is the contact surface 67 on a side of the dividing plate 60 opposite the first cover 40.

In FIG. 3, the contact area between the shutter 72 and the dividing plate 60 (contact surface 67) in shown with dash lines, with its rotation direction shown with arrow R. At any position, the shutter 72 is configured to cover at least one aperture 62, or more generally at least the apertures 62 corresponding to a same distribution column 32, in order to isolate said distribution column 32 and enable backwashing through said distribution column 32 in a manner known per se. The contact area radially extends up to a radius R2 greater than R1. In this way, thanks to sealing contact in the annular strip between radii R1 and R2, leakage can be decreased.

It is noteworthy than the fastener 82 and any means related thereto, e.g. the orifice 68, are located at or beyond a radius R3 greater than R2. Therefore, there is no interaction between the fastener 82 and the distributor 70. More generally, the fastener 82 may be arranged outside of a path of the rotary backwashing distributor 70 on the dividing plate 60.

Thus, in this embodiment, the radial extension of the distributor 70 is greater than the radial extension of the apertures 62 and less than the radial position of the fastener 82.

Figure 5:
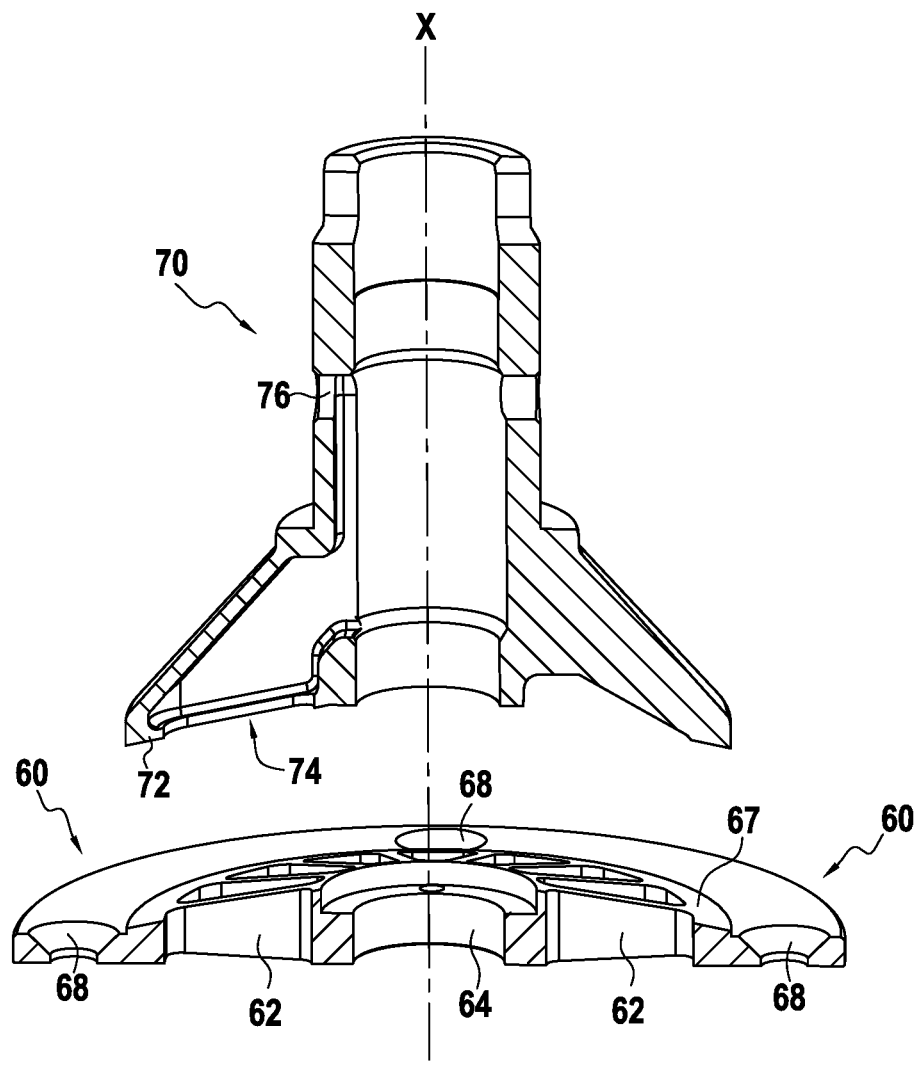
FIG. 5 is a perspective cross-sectional view of a distributor and dividing plate according to another embodiment.

FIG. 5 illustrates another embodiment, in which the dividing plate 60 has a conical contact surface 67 for contact with the rotary backwashing distributor 70. The distributor 70, and more specifically the shutter 72, has a corresponding shape, e.g. an oblique surface in axial cross-section. A conical contact surface 67 may facilitate the fluid flowing into the distribution columns. Note that the dividing plate 60 may have a non-conical shape outside the contact surface 67, for instance, as shown in FIG. 5, a planar shape radially outside the contact surface 67. The opposite end surface of the dividing plate 60 may be planar or have another shape as well, depending on its cooperation at least with the divider 30.

The first cover 40 may be made of a metal or alloy, e.g. aluminum.

The dividing plate 60 may be made of a low-friction material such as bronze, plastics (e.g. polyamide, polyoxymethylene, polytetrafluoroethylene such as Teflon, etc.), etc. For these materials or for other possible materials, it is desirable that the contact surface 67 of the dividing plate 60 for contact with the rotary backwashing distributor 70, has a friction coefficient less than a friction coefficient of the cover 40, i.e. less than a friction coefficient that the first cover 40 would have if the distributor 70 were to slide against the first cover 40.

For instance, the surface roughness of the contact surface 67 may be quantified by its average value Ra being less than 5 µm (micrometers), preferably less than 2 µm, more preferably less than 1 µm.

The rotary backwashing distributor 70 may be made of a metal or alloy, e.g. hard steel or aluminum, or different plastics. Other materials are also encompassed.

All materials may be chosen according to their compatibility with the fluid to filter, e.g. in terms of chemical reactions, corrosion, etc.

Turning to FIG. 4, it can be seen that the apertures 62 are aligned with the distribution columns 32. To this end, as previously mentioned, an indexer 89 may be configured to index a position of the dividing plate 60 with respect to the divider 30. In this embodiment, the indexer 89 is a guiding pin received in an orifice 69 of the dividing plate 60 and a corresponding orifice 37 of the divider 30. In this embodiment, the orifice 37 is provided in the core 36 of the divider 30. However, other embodiments are also contemplated, e.g. indexing both the dividing plate 60 and the divider 30 with respect to the first cover 40 or another fixed member.

In this embodiment, the dividing plate 60 is secured to the divider 30. For instance, an insert 80 may be fitted in a bore 39 of the divider 30 and the hole 64 of the dividing plate 60 to secure the dividing plate 60 to the divider 30. Here, the insert 80 has an external thread 84 configured to be threaded onto a matching thread provided in the bore 39. An axial stop 86 may radially project from the insert 80. The axial stop 86 is radially greater than the hole 64. When the insert 80 is inserted into the hole 64 and the bore 39, the axial stop 86 helps forcing the dividing plate 60 against the divider 30, thus increasing fluid-tightness. As an alternative to the embodiment shown in FIG. 4, the axial stop 86 may be chamfered and the hole 64 correspondingly tapered, so that the axial stop 86 is flush with the contact surface 67.

More generally, in this configuration, the dividing plate is secured to the divider 30 by being sandwiched between the divider 30 and the insert 80.

The insert 80 may be hollow, e.g. in the form of a sleeve, as shown in FIG. 4, in order to enable passage of mechanical or electrical components, or flow of fluid, therethrough.

The insert 80 may define, with the rotary backwashing distributor 70, a fluid transfer chamber 88. In this embodiment, the fluid transfer chamber 88 is annular and radially defined between the distributor 70 and the insert 80. Backwash fluid evacuated by the discharge opening 74 may flow to the fluid transfer chamber 88 before being evacuated through an outlet port 76 (or, as illustrated, at least two outlet ports 76). Recuperation of backwash fluid at the outlet ports 76 is described below according to the present embodiment, although alternatives may be carried out by the skilled person. In order to increase the volume of the fluid transfer chamber 88, the insert 80 may have a recess 87, here annular. For the purpose of sealing, seals such as O-rings may be provided at either sides of the recess 87.

Instead of providing the insert 80, the divider 30 and the dividing plate may be secured to each other by other means, e.g. permanently, such as welding or being integral with each other. Permanent securing provides the function of both attaching and indexing. In these embodiments, the indexer 89 may take the form of a weld bead.

Back to FIG. 1, the filter 100 comprises at least one inlet portion 112 and at least one outlet portion 114, e.g. formed in the casing 110. In this embodiment, there is shown one inlet portion 112 that is fluidly connected to the passages of the inner edges 24 of the filter elements 10, and one outlet portion 114 that is fluidly connected to the passages of the outer edges 26. However, a plurality of inlet portions 112 and/or outlet portions 114 is also encompassed.

At least one outlet 116 for the backwash liquid may also be formed in the casing 110.

The filter 100 further comprises a filter head 106. The filter head 106 also carries a motor 104 axially, which motor 104 is configured to drive the rotary backwashing distributor 70 in rotation. The motor 104 may be a hydraulic motor. A lid 108 separates an inner space of the casing 110 that receives the fluid to be filtered, on the side of the filtering unit 10, from an inner space of the casing that receives the motor 104. The connection between the hydraulic motor 104 and the rotary backwashing distributor 70 extends through the lid 108 in sealed manner.

Independently of its separating function, in this embodiment, the lid 108 defines at least one duct 109, or a plurality as illustrated, establishing fluid communication between the outlet ports 76 and the backwash liquid outlet 116. Annular chambers may be provided at either end portions of the ducts 109, as illustrated, to enable fluid flow irrespective of the angular alignment between the different parts.

In operation, the liquid for cleaning is inserted via the inlet portion 112 of the casing 110, penetrates into the distribution columns 32 (between the fins 34) that are not isolated by the backwashing distributor 70. The purified liquid is delivered to the outside of the filtering component 20 and is removed by the outlet portions 114 of the casing 110. At the same time, the backwashing distributor 70 is driven to rotate slowly by the motor 104. The backwashing liquid is discharged from the discharged opening 74 and led to the outlet 116 for the backwash liquid by the above-described structure.

With reference to FIG. 2, it can be seen how the filtering unit 10 can be replaced. The rotary backwashing distributor 70 may be removed. Then the dividing plate 60 may be detached, e.g. by removing the insert 80 and/or the fastener 82, as applicable. Then, the dividing plate 60 may be repaired to form a replacement dividing plate, or a new dividing plate may be supplied as the replacement dividing plate. Then, the replacement dividing plate may be secured with respect to the cover, e.g. thanks to the insert 80 and/or the fastener 82, as applicable. Then, the rotary backwashing distributor may be set back like it was removed, in reverse.

Although the present disclosure refers to specific exemplary embodiments, modifications may be provided to these examples without the departing from the general scope of the invention as defined by the claims. In particular, although the divider 30 is located radially inside the filtering component 20 in the described embodiment, embodiments in which the divider 30 is radially outside the filtering component 20, with all modifications implied as regards the other components such as the cover 40 and the dividing plate 60, are also contemplated. More generally, individual characteristics of the different illustrated/mentioned embodiments may be combined in additional embodiments. Therefore, the description and the drawings should be considered in an illustrative rather than in a restrictive sense.

The invention claimed is:

1. A filtering unit comprising:
   a filtering component having an inner wall, an outer wall arranged around the inner wall so as to define an inner space between the inner wall and the outer wall, and a filtering medium partitioning the inner space into a pre-filter chamber and a post-filter chamber, at least said pre-filter chamber being circumferentially compartmented in sectors, at least one of said inner wall and said outer wall having passages respectively communicating with corresponding ones of the sectors,
   a divider arranged coaxially with the filtering component, the divider having distinct distribution columns;
   a cover arranged at an axial end of the filtering component;
   a rotary backwashing distributor having a shutter provided with a discharge opening, the rotary backwashing distributor being mounted to rotate so that said discharge opening is periodically and selectively put into communication with each distribution column, whereby each distribution column periodically and selectively establishes communication between the discharge opening and respective ones of the passages; and
   a dividing plate arranged between the cover and the rotary backwashing distributor, the dividing plate being detachably secured with respect to the cover and having apertures opening into the distribution columns,
   wherein the shutter abuts a contact surface of the dividing plate at least on a closed contour surrounding the discharge opening.

2. The filtering unit as claimed in claim 1, wherein the contact surface of the dividing plate, for contact with the shutter of the rotary backwashing distributor, is axisymmetric.

3. The filtering unit as claimed in claim 1, wherein the apertures are aligned with the distribution columns.

4. The filtering unit as claimed in claim 1, wherein the dividing plate extends radially beyond the divider.

5. The filtering unit as claimed in claim 1, wherein the cover has an axial opening for circulation of fluid from the distribution columns or to the distribution columns, wherein the dividing plate is radially greater than the axial opening.

6. The filtering unit as claimed in claim 1, wherein the dividing plate abuts the cover and the divider, on a side of the cover opposite the filtering component.

7. The filtering unit as claimed in claim 1, further comprising a fastener for fastening the dividing plate to the cover, the fastener being arranged outside of a path of the rotary backwashing distributor on the dividing plate.

8. The filtering unit as claimed in claim 7, wherein the dividing plate comprises an annular portion radially adjacent to the apertures, and the fastener is provided on the annular portion.

9. The filtering unit as claimed in claim 1, wherein the dividing plate is secured to the divider.

10. The filtering unit as claimed in claim 9, wherein the divider has a bore and the dividing plate has a hole, and an insert is fitted in the bore and the hole to secure the dividing plate to the divider.

11. The filtering unit as claimed in claim 1, wherein the filtering component comprises a stack of filter elements.

12. The filtering unit as claimed in claim 11, wherein each filter element has an inner edge and a concentric outer edge, and a filtering medium extending between the inner edge and the outer edge, and wherein the inner wall comprises the stack of the inner edges and the outer wall comprises the stack of the outer edges.

13. The filtering unit as claimed in claim 12, wherein each filter element has an internal face and an external face, and wherein two adjacent filter elements of at least one pair of filter elements of the stack are assembled one against the other so that their facing internal faces define a space that is radially compartmented in sectors by contacting radial ribs of said internal faces, said outer edges and inner edges having respective passages communicating with corresponding ones of the sectors.

14. A filter comprising the filtering unit as claimed in claim 1.

15. A method of repairing the filtering unit as claimed in claim 1, the method comprising:
   removing the rotary backwashing distributor;
   detaching the dividing plate;
   securing a replacement dividing plate with respect to the cover; and
   setting back the rotary backwashing distributor.

16. The filtering unit as claimed in claim 2, wherein the apertures are aligned with the distribution columns.

17. The filtering unit as claimed in claim 2, wherein the dividing plate extends radially beyond the divider.

18. The filtering unit as claimed in claim 3, wherein the dividing plate extends radially beyond the divider.

19. The filtering unit as claimed in claim 2, wherein the cover has an axial opening for circulation of fluid from the distribution columns or to the distribution columns, wherein the dividing plate is radially greater than the axial opening.

20. The filtering unit as claimed in claim 3, wherein the cover has an axial opening for circulation of fluid from the distribution columns or to the distribution columns, wherein the dividing plate is radially greater than the axial opening.

\* \* \* \* \*